OR  3,542,449

X 3052 H

United States Patent

[11] 3,542,449

[72] Inventor Raoul F. Van Ligten
Worcester, Massachusetts
[21] Appl. No. 754,124
[22] Filed Aug. 5, 1968
Continuation-in-part of Ser. No. 415,262, Dec. 2, 1964, abandoned.
[45] Patented Nov. 24, 1970
[73] Assignee American Optical Corporation
Southbridge, Massachusetts
a corporation of Delaware by mesne

[54] HIGH DENSITY HOLOGRAPHIC INFORMATION STORAGE AND RETRIEVAL DEVICE
8 Claims, 3 Drawing Figs.
[52] U.S. Cl. .................................................... 350/3.5
[51] Int. Cl. ................................................. G02b 27/00
[50] Field of Search............................................ 350/3.5,
(OSR Digest), 162.5

[56] References Cited
UNITED STATES PATENTS
2,770,166 11/1956 Gabor ........................... 350/12
2,982,176 5/1961 Kay ............................. 88/Hol. Dig.
OTHER REFERENCES
Leith et al., Journal of the Optical Society of America Vol. 54, No. 11, pp. 1295— 1301, Nov. 1964

Leith et al., Journal of the Optical Society of America Vol. 53, No. 12, Dec. 1963, pp. 1377— 1381

Primary Examiner—David Schonberg
Assistant Examiner—Ronald J. Stern
Attorneys—William C. Nealon, Noble S. Williams and Robert J. Bird ABSTRACT: A number of independent holograms of different objects can be sequentially recorded one at a time on a single area of film with each hologram recording occupying the entire area and the information from each of the objects independently derived one at a time by passing a ray of coherent light through the record onto a receiving screen and selectively varying the radius of curvature of the wave front of the ray to reproduce first one object and then the other. In contrast to the recording of a three-dimensional object wherein it is desired to reproduce information from the entire volume of the object at one time each object in the present arrangement is two-dimensional and is reproduced individually. High order interference effects would cause interference information from adjacent objects when one object is being reproduced but by using a reference beam for recording which is about ten times the intensity of the object beam, such interference patterns are eliminated.

Patented Nov. 24, 1970

3,542,449

INVENTOR.
RAOUL F. VAN LIGTEN

BY

ATTORNEY

HIGH DENSITY HOLOGRAPHIC INFORMATION STORAGE AND RETRIEVAL DEVICE

This is a continuation of U.S. Pat. application Ser. No. 415,262, filed Dec. 2, 1964 and now abandoned.

This invention relates generally to information storage and retrieval systems and more particularly to high density information storage and retrieval systems using holography for storage.

The phenomenon of holograms can best be understood by reference to an article in the JOURNAL OF THE OPTICAL SOCIETY OF AMERICA Volume 53, Page 1377 (1963). In that paper, E. Leith and J. Upathnieks describe a method for producing a two-beam hologram in which an object transparency is illuminated with monochromatic spatially coherent light and a Fresnel diffraction pattern of the object is formed on a film. Adjacent to the object, a prism intersects half of the coherent beam and deviates it through an angle sufficient to superimpose it, with the object-bearing portion of the beam, on the film, which acts as a square law detector and records an interference pattern of the two beams. The film, when developed by ordinary photographic techniques, is a hologram of the object. The illumination at the film has a square law modulation in which the amplitude portion of the Fresnel pattern amplitude-modulates the interference pattern and the phase portion phase-modulates the interference fringe pattern. The interference pattern thus becomes a modulated carrier, analogous to the temporal carrier wave used in communication systems.

Alternatively, the hologram can be thought of as a diffraction grating with the film producing a zero-order spectrum and a pair of first-order spectra. One of the first-order spectra produces a real image and the other a virtual image. Whereas a conventional diffraction grating has only inadvertently introduced irregularities, which give rise to undesired ghost lines, the hologram diffraction grating has irregularities which are deliberately introduced to form complete, well-defined images.

In a subsequent JOURNAL OF THE OPTICAL SOCIETY OF AMERICA article in Volume 54, page 1295 (1964), Leith and Upathnieks describe other methods for producing a two-beam hologram, all of which involve the use of two substantially equal intensity portions of the incident coherent beam to produce an object beam and a reference beam. Furthermore, in the last-mentioned article, the authors conjecture that a hologram technique could be used for superimposing the images of many objects, one object at a time, the objects occupying different, non-overlapping positions in space. However, the present inventor has determined that a conventional hologram as described by Leith and Upathnieks, using a beam-splitting arrangement to provide reference and object beams of substantially equal intensities for that purpose is greatly disadvantageous in the storing of printed information, since in retrieval the stored information-bearing object images cannot be independently retrieved.

Accordingly, a primary object of the present invention is to provide apparatus for storing images of printed information from successive pages and their retrieval.

A more specific object is to provide such apparatus wherein a significant ratio of intensities of the reference and object beams in produced, so that the capability for retrieval of the information without "crosstalk" is made possible.

These and other objects of the invention are accomplished in one embodiment of the invention which features means for dividing a beam of coherent light from a laser into a pair of beams of greatly different intensities, the more intense of which is deviated around an information-bearing object transparency and the less intense of which is directed through the object. The two beams are then combined to produce an image of the diffraction patterns representative of the information, which image can then be stored on a film for subsequent retrieval.

Other objects, features, modifications and embodiments will be apparent from the following more detailed description with reference to the accompanying drawings, wherein.

The high density storage of information has long been the goal of many scientists and engineers interested in the information-processing art. At the present time, the bulk of information storage is accomplished by use of what is commonly referred to as "microfilm", wherein the images of rather large objects, such as information from a page in a book, are reduced in size and recorded on a photographic film. The reduction is quite substantial and, therefore, allows the storage of a great deal of information in a very small area of film. Information stored by this device is retrieved by enlargement and projection of the information-bearing film or parts thereof on a projection screen or the like. However, the discrete steps of magnification in retrieval and demagnification in storage is accompanied by a degradation of information content caused by the transfer function of each optical system used. Furthermore, in both storing and retrieving the information, the alinement problems are difficult, since discrete pieces of information are retrieved only by positioning the system according to the specific information desired. Also, the optical system is usually so complicated that the relative mechanical alinement is easily disturbed. The most important disadvantage of microfilm systems has been found to be in the possibility of damage to a small segment of microfilm. Such damage irretrievably loses a part (possibily a large part) of the information stored.

It is well known in the hologram art that the image of an object stored on a film has the total information relating to each of its parts stored on the entire film, when the object beam is diffused before impinging on the object. Therefore, destruction of part of the film, used as the storage medium, causes only a slight reduction in quality of the information rather than the loss of any information. Furthermore, since no magnification and demagnification need be involved in a hologram system, the optical system used therein is simple and inexpensive, without the losses attendant in magnification and demagnification of information in a microfilm system.

Figure 1:
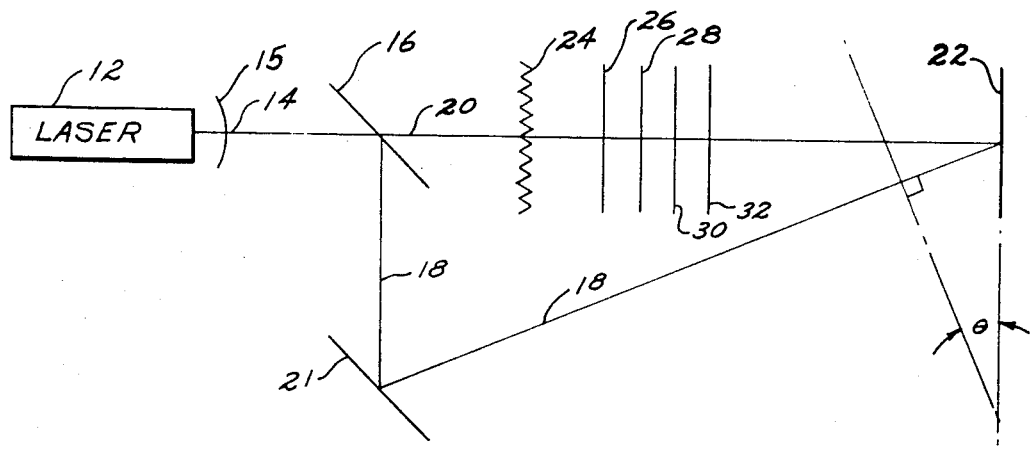
FIG. 1 is a schematic representation of apparatus useful in the storage of information from a number of transparent objects according to the present invention.

Referring first to FIG. 1, there is shown a laser device 12 or any other source capable of emitting a beam 14 of monochromatic, coherent light. The beam 14 is directed to a lens 15 for spreading the beam and then to a partially silvered mirror 16 which performs a beam-splitting operation to insure that the ratio of intensities of the diverted (reflected) reference beam to the transmitted object beam is in the range of at least ten to one. Stated another way, more than 90 percent of the intensity of the source light is reflected by the partially silvered mirror or any other satisfactory beam splitter. For the purposes of illustration only, the mirror 16 may be assumed to be silvered for 80 percent reflectivity and 20 percent transmissivity (in terms of amplitude) to thereby reflect a beam 18, which is approximately 16 times greater in intensity then the beam 20, which is transmitted through the partially silvered mirror 16. A totally reflecting mirror 21 is placed in the path of beam 18 to direct that beam to the hologram film 22. Beam 20, which is transmitted through the partially silvered mirror, impinges on a ground glass plate 24, or another type of diffusing device, to accomplish a total record of the object information on all parts of the film. The object 26, for the purposes of this description, is a transparency of an information-bearing page of a book, which, with the system as above described, is recorded on the film 22. The transparency 26 is then removed from the light of the beam 20 and replaced by transparency 28 in a different plane in space, which is recorded in the same way on the film 22. Successively, transparencies 30, 32, etc. are also recorded on the film.

For the embodiment shown in FIG. 1, high resolution 35 millimeter photographic film is used with an exposure time that is inversely proportional to the power output of the laser source. For instance, for a 20 microwatt output, an exposure time of 2 milliseconds is recommended for each information-bearing object; and for a 40 microwatt power output, an exposure time of 1 millisecond is recommended. The ground glass screen 24 is used, as was previously mentioned, to diffuse the laser beam, and thereby record all of the object on each part of the film.

Figure 2:
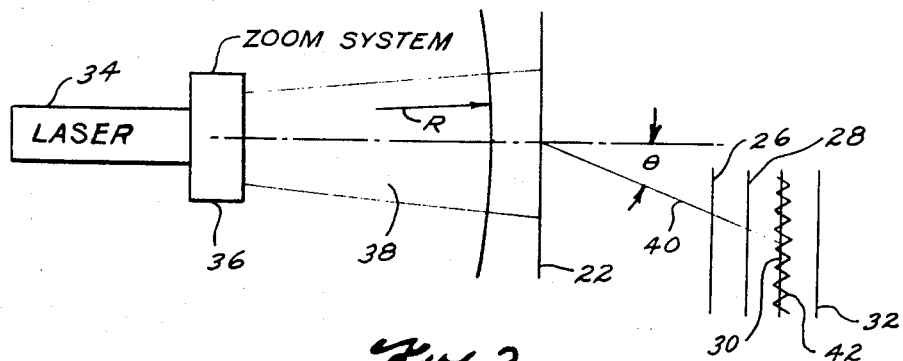
FIG. 2 is a schematic representation of the retrieval apparatus of the invention.

Retrieval of the information is performed by the apparatus shown schematically in FIG. 2, which comprises a laser 34 having a zoom system 36 (or another suitable optical system) at its output for directing a beam 38 of variable radius wave front onto the hologram film 22. The information content of the film 22 is then carried by beam 40 to projection screen 42 for visible retrieval of the information previously recorded on the film.

Since each information-bearing object is recorded at a different object distance (due to a difference in the distance of each object from the laser in recording), they may be separated upon projection by varying the image distance. Such a variation in image distance can be achieved either by moving a projection screen from one position to another in space or by moving the object images with relation to a fixed projection screen, so that only one image coincides with the screen at a given time. The latter method is achieved by varying the radius of curvature of the wave front used for reconstruction of the image. This results in a change in the image distance (distance between the film and the image plane) and such a variation of the radius of curvature in a compact volume is accomplished, in one embodiment, by use of a so-called "zoom system", which comprises two sets of lenses, one of which is fixed in space and the other of which is variable. The variable set of lenses has lenses fixed in relation to each other, so that they can be moved in relation to the other set but not in relation to each other. By moving this variable-position set of lenses, the object distance of the lens system can be changed to produce on the screen 42 only one information-bearing object at a time. The variation in object distance accomplishes the variation in the radius of curvature of the wave front by moving its center of curvature, so that a focus control, such as that found on many projectors, is useful for this purpose also.

Furthermore, the variation in the radius of curvature can be achieved by combining a conventional microscope objective with a conventional photographic objective into a telescope system. The point light source 34 is then imaged in the image plane of the microscope objective, which is coincident with the back focal point of the photographic objective. By varying the separation of the image plane of the microscope and the back focal point of the photographic objective, the wave fronts emerging from the photographic objective can be varied in radius to produce a full range of wave fronts extending from converging to diverging wave fronts.

By any of the above methods, the radius of curvature of the wave front emerging on the developed film determines the position in space of the projected real image. Therefore, for a specific wave front curvature, the image of information-bearing object 30 will be projected to coincide with screen 42 with the real images of other objects 26, 28, and 32 being formed in space, as aerial images, either in front of or behind the screen 42 as shown in FIG. 2. By increasing the radius of curvature R of the wave front, the image of object 28 will fall on screen 42 with the image of object 30 falling with the image of object 32 behind the screen. A further increase in the radius R will project the image of object 26 onto the screen, the images of objects being projected, in all cases, in an interfering relationship with the real images or other objects not chosen. However, the following analysis describes a method for alleviating the interfering condition that could exist if an image $F_i$ for one object is a cross-product (to be explained) for an image $F_j$ for another object in the equation of the projected image reconstruction. The system, as shown in FIG. 2, provides a further means of separation by projecting the desired image at an angle $\theta$ with the horizontal, the angle $\theta$ representing the angular separation between the reference and object beams as shown in FIG. 1.

Since the film is essentially a square law detector with the information recorded thereon being in the form of the intensity of the impinging light, the record on the film can be expressed as an intensity mask in the form of the sum of the complex terms representing the electric vectors of the electromagnetic vibration for the two beams (object and reference beams) multiplied by the complex conjugate of the sum of the same two terms:

$$(A+F_1)(A+F_1)*$$

with A representing the amplitude of the reference beam and $F_i$ representing the amplitude of the object beam.

Therefore, when the film is exposed to a number of object transparencies, additional terms, such as the one above, will be added (incoherent addition):

$$I=(A+F_1)(A+F_1)*+(A+F_2)(A+F_2)*$$
$$+\ldots(A+F_i)(A+F_i)$$
$$=|A|^2+|F_1|^2+AF_1*+A*F_1+|A|^2+|F_2|^2+AF_2*$$
$$+A*F_2+\ldots|A|^2+|F_i|^2+AF_i*+A*F_i$$
$$=i|A|^2+\sum_{i=1}^{n}|F_i|^2+\sum_{i=1}^{n}[AF_i*+A*F_i]$$

When the image is reconstructed by illuminating the developed film with coherent light, the film may be considered as an amplitude mask or the square root of the last-mentioned representation of the intensity record.

$$\sqrt{i|A|^2+\sum_{i=1}^{n}|F_i|^2+\sum_{i=1}^{n}[AF_i*+A*F_i]}$$

or $$\sqrt{i|A|^2+\sum_{i=1}^{n}|F_i|^2}\sqrt{1+\frac{\sum_{i=1}^{n}[AF_i*+A*F_i]}{\sum_{i=1}^{n}i|A|^2+\sum_{i=1}^{n}|F_i|^2}}$$

The latter equation is in the following form with $$x=\frac{\sum_{i=1}^{n}[AF_i*+A*F_i]}{\sum_{i=1}^{n}i|A|^2+\sum_{i=1}^{n}|F_i|^2}$$

$$\sqrt{|iA|^2+\sum_{i=1}^{n}|F_i|^2[(1+x)^c]}$$

the last term of which algebraically expands to:

$$(1+x)^c=1+cx+\frac{c(c-1)}{2!}x^2+\frac{c(c-1)(c-2)}{3!}x^3+\ldots$$

The first order terms, if we substitute for x, will provide the image, since only $A*F_i$ and its complex conjugate $AF_i*$ will be present in any term and the deflection terms A and A* (which equal $e^{i\theta}$ and $e^{-i\theta}$, respectively,) project the image at an angle $\theta$ as shown in FIG. 2.

The second order terms, $x^2$, contain components in the form of:

$$AA*F_i*F_j$$
$$AA*F_iF_j*, \text{etc.}$$

These forms show that an image $F_i$ from one object will be in the same object plane as the image $F_j$ from another object, since, as previously stated, a cross-product in any one term, which cannot be separated by varying object distance, produces this result. However, the deflection factor $AA^*$ (present in all second order terms) equals $$|A|^2 e^{i\theta} e^{-i\theta} \text{ or } |A|^2 e^{i0}$$

with 0 showing that all these terms will be projected on axis instead of at angle $\theta$. Therefore, no interference will occur on the line of sight for the screen 42.

The third order terms, $x^3$, contain components in the following form:

$$AAA^* F_i^* F_i^* F_j$$
$$AA^* A F_i^* F_i^* F_j, \text{ etc.}$$

Since all forms in the third order contain a deflection factor $AAA$ or combinations of three of the complex term $A$ and its complex conjugate $A^*$, the projection will either be at two or three times the angle $\theta$, which causes no problem, or at the angle $\theta$, which does cause interference in the same line of sight.

These troublesome terms must, therefore, be eliminated by a method other than deflection. The same problems also arise in higher order terms (fourth and fifth order, etc.), so a convergence of the series after the second order solves the problem. Such a convergence is attained by making the x term very much smaller than one or, in other words, by making $A$ much greater than $F$.

$$x \ll 1$$

$$\frac{\sum_{i=1}^{n}[AF_i^* + A^*F_i]}{\sum_{i=1}^{n}[i|A|^2 + |F_i|^2]} \ll 1$$

This can be realized by making $A = 10F$ (an amplitude ratio) which causes a factor of one hundred difference between the intensity of third and first order terms.

Third order: $\left[\frac{AF_i^* + A^*F_i}{|A|^2 + |F_i|^2}\right]^3 = \left(\frac{F_i^* + F_i}{A}\right)^3 \approx \frac{1}{A^3} \approx \frac{1}{1000}$
(simplified)

First order: $\left[\frac{AF_i^* + A^*F_i}{|A|^2 + |F_i|^2}\right] = \frac{F_i^* + F_i}{A} \approx \frac{1}{A} = \frac{1}{10}$
(simplified)

$$\therefore \frac{\text{First order}}{\text{Third order}} = 100.$$

The approximate limit of contrast perception is about ten to one, so the third order term will be imperceptible when viewing the first order term. It is then seen that an amplitude ratio of a little more than three to one will satisfy the requirement for an intensity ratio of approximately ten to one to also converge the series after the second order. The contrast of the first order will be unhampered by the ratio since the image obtained thereby is a product of an A term and an F term rather than a sum.

Summarizing the above, the image formula is the projection on the screen 42 and contains first, second, third, etc. order terms, some of which contain $F_i$ or $F_j$ or succeeding images, but not cross-products $F_i F_j$ etc., and others that do have the cross-products. The former are separated by projecting all $F_i$ images in one object plane, all $F_j$ images in another object plane, etc. The latter are eliminated by either their own inherent separation from the desired angle of projection or by converging the series (eliminating the higher order terms where cross-products occur at the same projection angle $\theta$) through use of an intensity ratio of at least ten to one.

Figure 3:
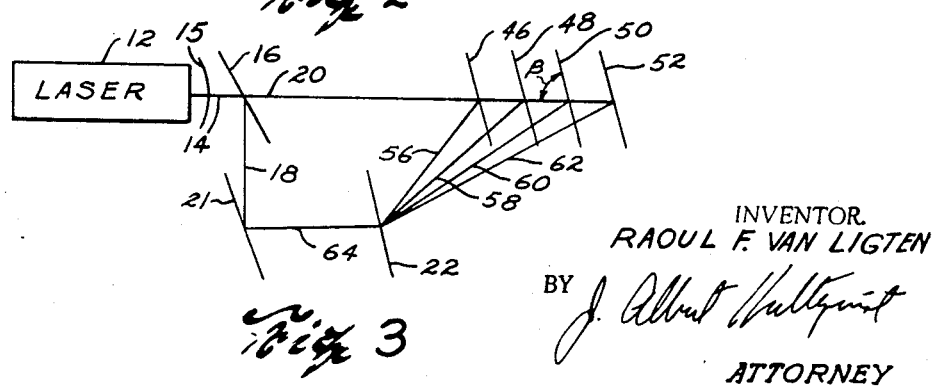
FIG. 3 is a schematic representation of an alternative apparatus for use in the storage of information from a number of nontransparent objects.

An alternative embodiment of the invention is shown in FIG. 3 wherein the objects, whose information is recorded, are nontransparent information-bearing pages 46, 48, 50 and 52. The laser 12 emits an output beam 14 which is spread by lens 15 and then split by partially silvered mirror into object beam 20 and reference beam 18. The reference beam 18 is substantially totally reflected by mirror 21 before it impinges on film 22. The object beam 20 is reflected from the object 46, 48, 50 or 52 to film 22.

With the apparatus as shown, the coherent object beams 56, 58, 60, and 62 impinge on the film 22 with an intensity of approximately 10 times less than the intensity of the reference beam 64. That intensity ratio is in the same range as the ratio of intensities mentioned for the embodiment of FIG. 1. However, the intensity ratio of the beams 20 and 18, as they leave the partially silvered mirror 16 in the embodiment of FIG. 3, are of a substantially inverse ratio; i.e. the object beam 20 is in the range of approximately 10 times greater in intensity than the reference beam 18. This initial inverse intensity ratio is used since most of the intensity of object beam 20 is lost in its reflection from the objects 46, 48, 50, and 52.

The function that is served by ground glass 24 in the embodiment of FIG. 1 (to diffuse the image of the objects over the entire hologram film, so that each part of the film contains a record of the entire object) is served by the objects themselves in the embodiment of FIG. 3. The nontransparent pages 46, 48, 50, and 52 sufficiently diffuse the image-bearing beams 56, 58, 60, and 62 to satisfy that purpose.

The parallel planes of the objects are at an angle $\beta$ with the object beam axis, so that the reflections therefrom impinge on film 22 together with the reference beam 64. Therefore, the embodiment of FIG. 3 is useful with the projection apparatus of FIG. 2 with slight modifications such as the adjustment of the angle $\theta$ to compensate for the angle $\beta$ of FIG. 3.

Also, it should be mentioned that, in view of the above description, it is contemplated that more than one page of a book may be used as a single object, thereby increasing the amount of information that can be stored on the film and retrieved without interference. For instance, each transparent or nontransparent object could contain a ten-by-ten matrix of pages of information.

I claim:

1. Apparatus for sequentially recording the information from a number of information-bearing objects on a single film one at a time comprising, arranged in sequence along an optical path: a coherent light source for directing a beam of coherent light along said path, a beam splitter for deriving a second beam of coherent light from said first-mentioned beam and directing said second beam along a second path, a station for sequentially receiving one at a time a number of information-bearing objects in spaced relationship relative to each other along said first path, a recording film having a single area on which information from all of said information-bearing objects is to be recorded over said entire area intersecting said first path, means for directing said second beam along said second path so that said film also intersects said second beam whereby a hologram record of each of said number of information-bearing objects is sequentially recorded one at a time over the entire area of said film, said beam splitter being so arranged as to provide an intensity of said second beam greater than the intensity of said first beam whereby high order interference patterns in each of said hologram records which would cause interference between successive records is eliminated.

2. Apparatus as set forth in claim 1 in which a light diffusing screen is positioned to intersect said first path between said beam splitter and said station for said information-bearing objects.

3. Apparatus as set forth in claim 1 in which said beam splitter is a partially silvered mirror which reflects into said second path more than 90 percent of the light incident on it from said source and transmits the remainder to said first path.

4. Apparatus as set forth in claim 1 wherein each of said objects is a transparency.

5. Apparatus as set forth in claim 1 wherein said information-bearing objects are disposed in parallel planes normal to said first path.

6. Apparatus for selectively recovering information which has been previously sequentially recorded on a single area of film from a plurality of spaced information-bearing objects, such apparatus comprising:
- a coherent light source for projecting a light wave train along a path through said film onto a projection screen; and
- means to vary the radius of curvature of the wave front of said train to selectively project images of said information from said film area onto said screen.

7. The method of storing the information from a number of information-bearing objects on a single area of film so that they can be separately retrieved comprising the steps of:
- a. directing the output of a coherent light source through a beam splitter to divide said output into two beams of different intensities;
- b. placing one of said objects in the path of the beam of lesser intensity in a plane in one position in space;
- c. directing the larger intensity beam around said object to a film;
- d. directing the beam of lesser intensity passing through said object onto said film;
- e. removing said object;
- f. placing another object in the path of the lesser intensity beam in a different plane than the plane of the first-mentioned object, said planes being perpendicular to the direction of said path;
- g. repeating steps c through e for said other object; and
- h. repeating steps f and g for all other objects.

8. The method of storing the information from a number of information-bearing objects on a single area of film so that they can be separately retrieved and of selectively retrieving the same comprising the steps of:
- a. directing the output of a coherent light source through a beam splitter to divide said output into two beams of intensities differing by a factor of approximately 10 to 1;
- b. placing one of said objects in the path of the beam of lesser intensity in a plane in one position in space;
- c. directing the larger intensity beam around said object to a film;
- d. directing the beam of lesser intensity passing through said object onto said film;
- e. removing said object;
- f. placing another object in the path of the lesser intensity beam in a different plane than the plane of the first-mentioned object, said planes being perpendicular to the direction of said path;
- g. repeating steps c through e for said other object;
- h. repeating steps f and g for all other objects;
- i. projecting an image of one of said objects by passing a light wave train from a coherent light source through said film and onto a screen; and
- j. selectively projecting images of other of said objects by selectively varying the radius of curvature of the wave front of said train impinging on said film.